(12) United States Patent
Bowers et al.

(10) Patent No.: US 9,057,833 B2
(45) Date of Patent: Jun. 16, 2015

(54) VEHICLE MIRROR ASSEMBLY

(71) Applicant: Nissan North America, Inc., Franklin, TN (US)

(72) Inventors: Kenneth Bowers, Romeo, MI (US); Alfredo Dimichele, Macomb Township, MI (US); Kathryn Templeton, Bloomfield Hills, MI (US); Kurt Maxwell, New Hudson, MI (US); Takashi Kuwata, Saitama (JP)

(73) Assignee: Nissan North America, Inc., Franklin, TN (US)

( * ) Notice: Subject to any disclaimer, the term of this patent is extended or adjusted under 35 U.S.C. 154(b) by 258 days.

(21) Appl. No.: 13/630,786

(22) Filed: Sep. 28, 2012

(65) Prior Publication Data

US 2014/0092495 A1 Apr. 3, 2014

(51) Int. Cl.
| G02B 5/08 | (2006.01) |
| G02B 7/18 | (2006.01) |
| G02B 7/182 | (2006.01) |
| B60R 1/06 | (2006.01) |
| B60R 11/04 | (2006.01) |
| B60R 1/12 | (2006.01) |

(52) U.S. Cl.
CPC . *G02B 7/182* (2013.01); *B60R 1/06* (2013.01); *B60R 11/04* (2013.01); *B60R 2001/1253* (2013.01)

(58) Field of Classification Search
None
See application file for complete search history.

(56) References Cited

U.S. PATENT DOCUMENTS

| 4,583,155 | A | 4/1986 | Hart |
| 7,270,430 | B2 | 9/2007 | Olijnyk et al. |
| 7,287,867 | B2 | 10/2007 | Wellington et al. |
| 7,445,392 | B2 | 11/2008 | Straehle et al. |
| 7,517,099 | B2 | 4/2009 | Hannah |
| 7,540,619 | B2 | 6/2009 | Henion |
| 7,825,951 | B2 | 11/2010 | Lang et al. |
| 8,182,125 | B2 | 5/2012 | Englander et al. |
| 8,243,994 | B2 | 8/2012 | Suzuki et al. |
| 2004/0121820 | A1 | 6/2004 | Unno et al. |
| 2008/0100939 | A1* | 5/2008 | Brester ............... 359/872 |
| 2010/0238051 | A1 | 9/2010 | Suzuki et al. |
| 2012/0069182 | A1 | 3/2012 | Sumi et al. |
| 2014/0063233 | A1 | 3/2014 | Henion et al. |

FOREIGN PATENT DOCUMENTS

| EP | 0945305 A1 | 9/1999 |
| JP | 2008-049783 A | 3/2008 |
| JP | 2010-012865 A | 1/2010 |
| WO | WO-2008/068573 A2 | 6/2008 |

* cited by examiner

*Primary Examiner* — Jade R Chwasz
(74) *Attorney, Agent, or Firm* — Global IP Counselors, LLP

(57) ABSTRACT

An exterior vehicle mirror assembly includes a base, a mirror housing and a camera housing. The base has a mounting portion configured to attach to an exterior vehicle panel. The mirror housing is coupled to the base and extends from the base. The camera housing is coupled to the base adjacent to the mirror housing and extends from the base such that the mirror housing and the camera housing extend away from the base in respective directions are substantially parallel to one another with the mirror housing in an in-use orientation. A distal end of the camera housing is spaced apart from the mirror housing.

20 Claims, 5 Drawing Sheets

VEHICLE MIRROR ASSEMBLY

BACKGROUND

1. Field of the Invention

The present invention generally relates to a vehicle mirror assembly. More specifically, the present invention relates to a vehicle mirror assembly that includes a mirror housing and a camera housing where the camera housing projects laterally outward from the side of the vehicle beneath the mirror housing with the mirror housing in an in-use orientation.

2. Background Information

All vehicles typically include at least one mirror assembly mounted to a fender or exterior of a door of the vehicle such that the mirror provides a rearward view. More specifically, the mirror assembly is positioned such that a vehicle operator can look in the mirror and observe areas at the side of the vehicle that are rearward relative to the vehicle operator. Recently, the mirror assembly has been modified to include features like telescopic movement and pivoting movement (aka folding movement). For instance, with the mirror in an in-use orientation (where a rearward view is visible in the mirror to the vehicle operator), the mirror can undergo telescopic movement. The telescopic movement is such that a mirror housing of the mirror assembly is able to move between a retracted position and an extended position. In both the retracted position and the extended position, the mirror is maintained in an in-use orientation. In the extended position, the mirror is positioned laterally further away from the side of the vehicle than in the retracted position.

The telescopic movement is advantageous when the vehicle is pulling, for example, a trailer. In the extended position, the lateral telescopic movement away from the vehicle provides the vehicle operator with an increased field of view through the mirror of the mirror assembly.

The pivoting movement of the mirror assembly allows the mirror assembly to be moved between a folded position and the in-use orientation. In the folded position, the mirror is pivoted to face the vehicle door. In the folded position, the mirror assembly does not extend much beyond the side of the vehicle, making it easier to move around the side of the vehicle when parked in cramped spaces.

SUMMARY

One object is to provide a mirror assembly with a camera disposed in a camera housing separate from a mirror housing, where the mirror housing can undergo telescopic movement relative to a side of the vehicle in an in-use orientation while the camera housing and a camera remain in a fixed position with the mirror housing in an in-use orientation.

In view of the state of the known technology, one aspect of the present disclosure is to provide an exterior vehicle mirror assembly with a base, a mirror housing and a camera housing. The base has a mounting portion configured to attach to an exterior vehicle panel. The mirror housing is coupled to the base and extends from the base. The camera housing is coupled to the base adjacent to the mirror housing and extends from the base such that the mirror housing and the camera housing extend away from the base in respective directions that are substantially parallel to one another with the mirror housing in an in-use orientation. A distal end of the camera housing is spaced apart from the mirror housing.

BRIEF DESCRIPTION OF THE DRAWINGS

Referring now to the attached drawings which form a part of this original disclosure.

DETAILED DESCRIPTION OF EMBODIMENTS

Selected embodiments will now be explained with reference to the drawings. It will be apparent to those skilled in the art from this disclosure that the following descriptions of the embodiments are provided for illustration only and not for the purpose of limiting the invention as defined by the appended claims and their equivalents.

Figure 1:
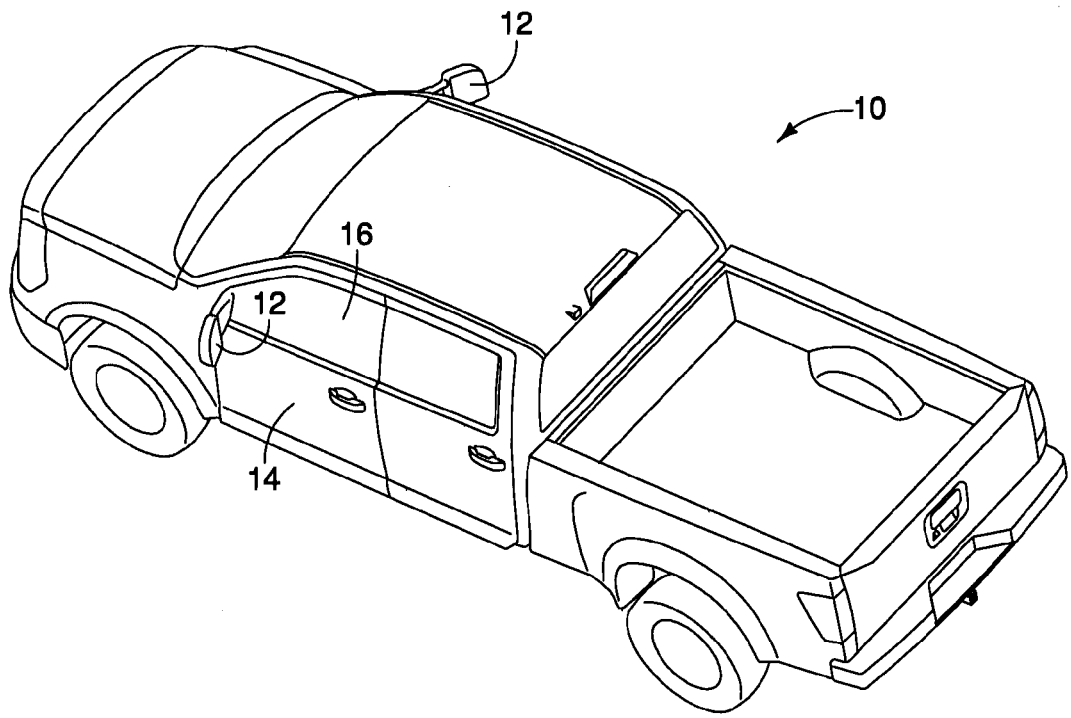
FIG. 1 is a perspective view of a vehicle that includes a pair of mirror assemblies in accordance with various embodiments.

Referring initially to FIG. 1, a vehicle 10 having a mirror assembly 12 is illustrated in accordance with a first embodiment. The vehicle 10 is depicted as a truck but can be any vehicle design that includes side view mirrors, such as the mirror assembly 12, described in greater detail below.

Figure 2:
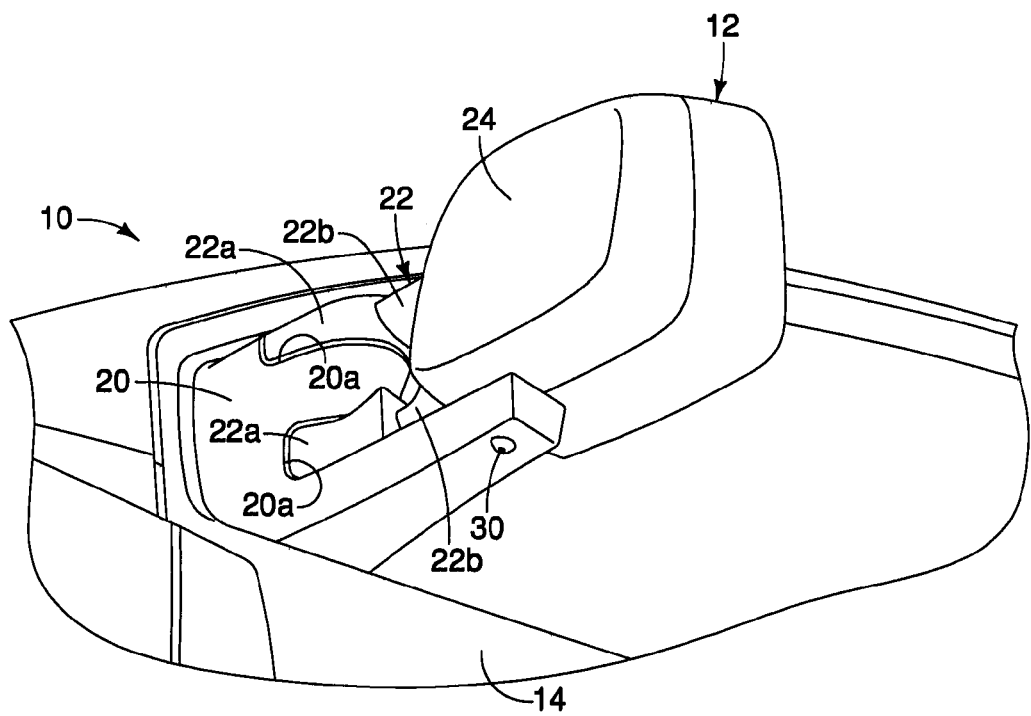
FIG. 2 is a perspective view of one of the mirror assemblies of the vehicle showing a base, a mirror housing and a camera housing that includes a camera, with the mirror housing being in an in-use orientation and retracted position in accordance with a first embodiment.

The vehicle 10 includes a variety of features, such as side doors 14 (only one side door is depicted in FIGS. 1 and 2) and a passenger compartment 16. The vehicle 10 includes many other features. However, description of these other features is not necessary to understand the present invention. Therefore, further description of these features is omitted for the sake of brevity.

The vehicle 10 also includes a video system that includes a plurality of cameras and a display on an instrument panel within the passenger compartment 16 of the vehicle 10. Each of the plurality of cameras is trained on a different area around the outer periphery of the vehicle 10. An image processor takes the images captured by each of the plurality of cameras and streams these captured images to the display in the instrument panel of the vehicle 10. An operator or driver of the vehicle 10 can observe the areas around the vehicle 10 captured by the plurality of cameras by watching the display. The video system provides the driver with an added level of perception while performing certain operations, such as backing up and parking. The video system can include a feature in which the images captured by the plurality of cameras are superimposed over a still image of the vehicle to orient the viewer. When such a feature is employed, it is important that each of the plurality of cameras is in a fixed position relative to the vehicle 10 for accurate processing of the captured images. It should be understood that the mirror assembly 12 described hereinbelow can be used with such a video system. Therefore the location of each of the plurality of cameras should remain fixed relative to the vehicle 10 when the video system is in use. Such video systems are known and therefore, further description is omitted for the sake of brevity.

More detailed descriptions of various video systems can be found in, for example, U.S. Patent Application Publication No. 2010/0238051, published Sep. 23, 2010 (application Ser. No. 12/680,423), U.S. Patent Application Publication No. 2012/0069182, published Mar. 22, 2012 (application Ser. No. 13/232,146), and U.S. Pat. No. 8,243,994, issued Aug. 14, 2012 (application Ser. No. 12/298,837) all commonly assigned to Nissan Motor Co. Ltd. The disclosures of U.S. Patent Application Publication No. 2010/0238051, U.S. Patent Application Publication No. 2012/0069182, and U.S. Pat. No. 8,243,994 are incorporated herein by reference in their entirety.

There are two mirror assemblies 12 depicted in FIG. 1. The two mirror assemblies 12 are basically identical except that they are symmetrical to one another (mirror images of one another). Therefore description of one mirror assembly 12 applies to both.

As shown in FIG. 2, the mirror assembly 12 is fixedly attached to the side door 14 of the vehicle 10. The attachment between the mirror assembly 12 and the side door 14 is conventional and therefore description is omitted for the sake of brevity. However, it should be understood from the drawings and the description herein that the mirror assembly 12 can be attached to the side door 14 by any of a variety of means, such as threaded fasteners, snap-fitting projections, rivets, or other mechanical fastening arrangements.

The mirror assembly 12, in accordance with of a first embodiment is now described with specific reference to FIGS. 3-6. The mirror assembly 12 basically includes a vehicle attachment member 20 (or mirror base), a telescoping portion 22, a mirror housing 24, an adjustable mirror 26, a camera housing 28, a camera 30 and a secondary mirror 32.

Figure 4:
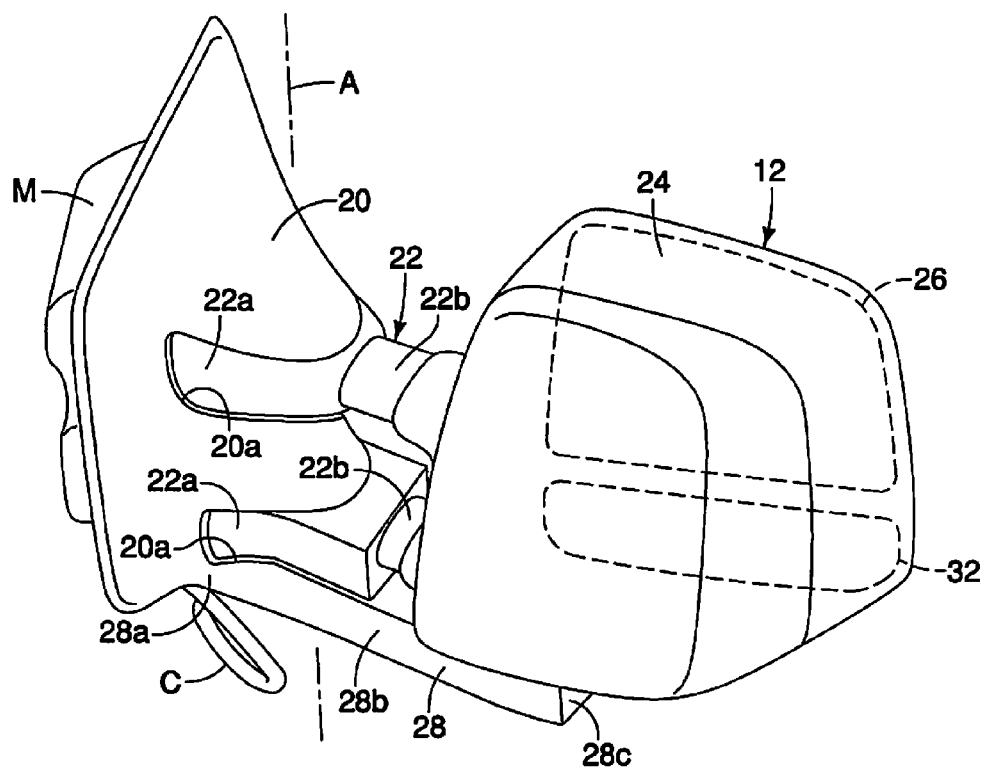
FIG. 4 is another perspective view of the mirror assembly depicted in FIG. 2, with the mirror housing in the in-use orientation and the retracted position and the camera housing in the fixed position in accordance with the first embodiment.
Figure 5:
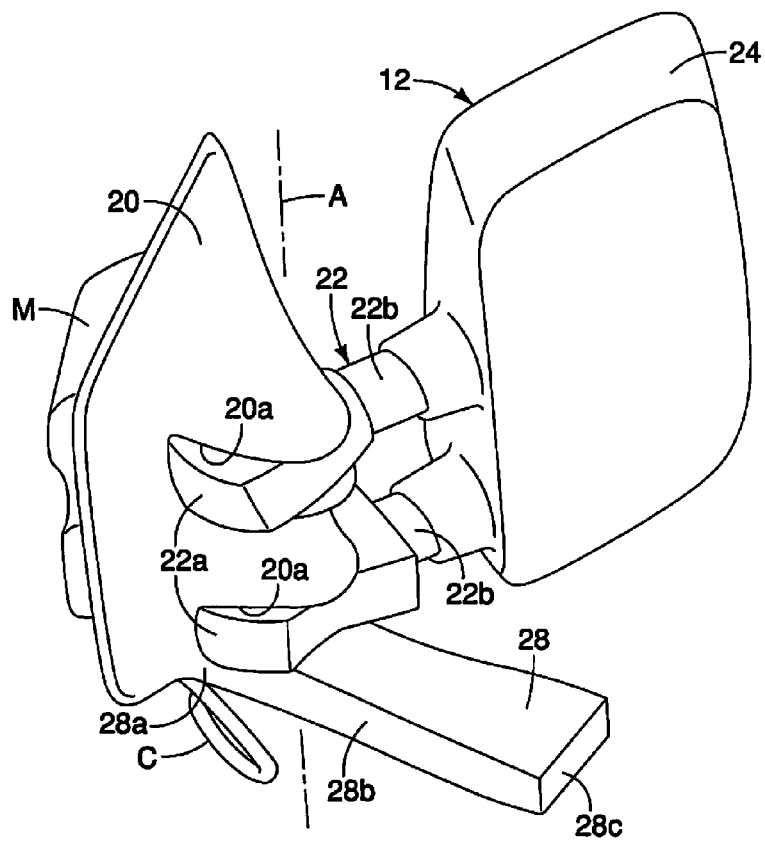
FIG. 5 is another perspective view of the mirror assembly similar to FIG. 4, showing the mirror assembly in a folded position and the camera housing in the fixed position in accordance with the first embodiment.
Figure 6:
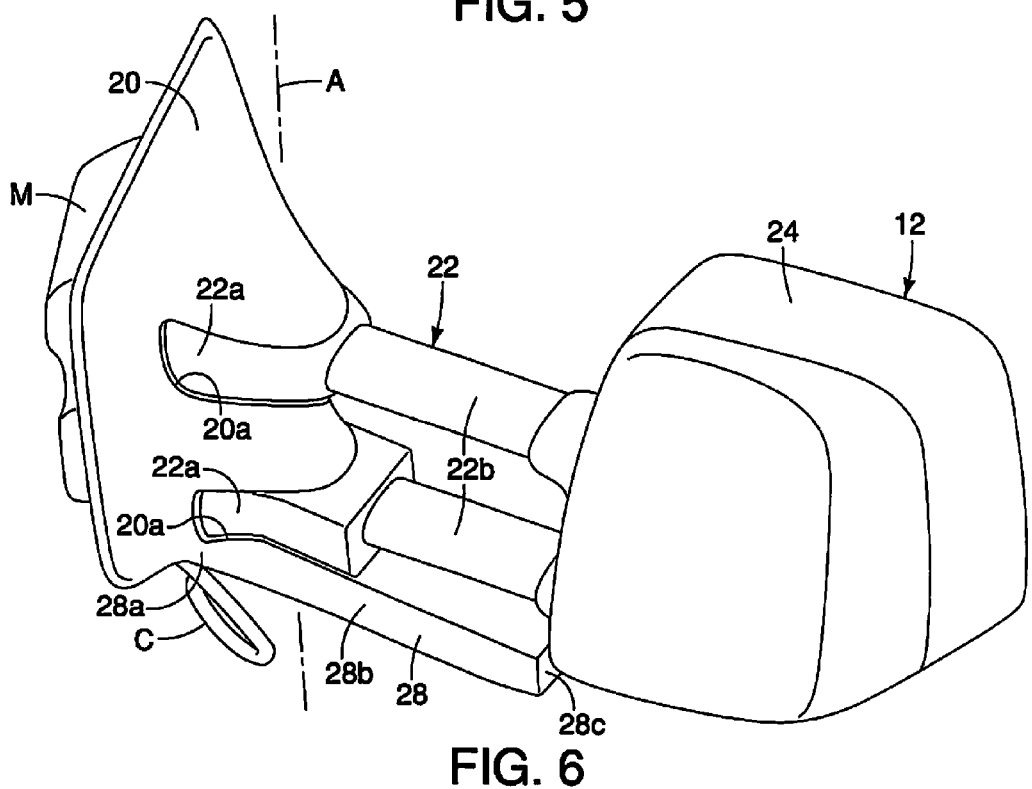
FIG. 6 is another perspective view of the mirror assembly similar to FIGS. 4 and 5 showing the mirror assembly in the in-use orientation and an extended position and the camera housing in the fixed position in accordance with the first embodiment.

As indicated in FIGS. 4-6, the vehicle attachment member 20 includes a mounting section M that is configured for attachment to the side door 14 of the vehicle 10. However, it should be understood from the drawings and the description herein that the vehicle attachment member 20 can also attach to a fender or an A-pillar of the vehicle 10, as long as the mirror assembly 12 is positioned to provide a view of the areas rearward from the vehicle operator and to the side of the vehicle 10, while the vehicle operator is seated in the driver's seat and/or the passenger's seat of the vehicle 10. As is mentioned above, the mounting section M of the vehicle attachment member 20 attaches to the vehicle 10 in any of a variety of conventional attachment configurations. Since such attachment configurations are conventional, further description is omitted for the sake of brevity.

Figure 3:
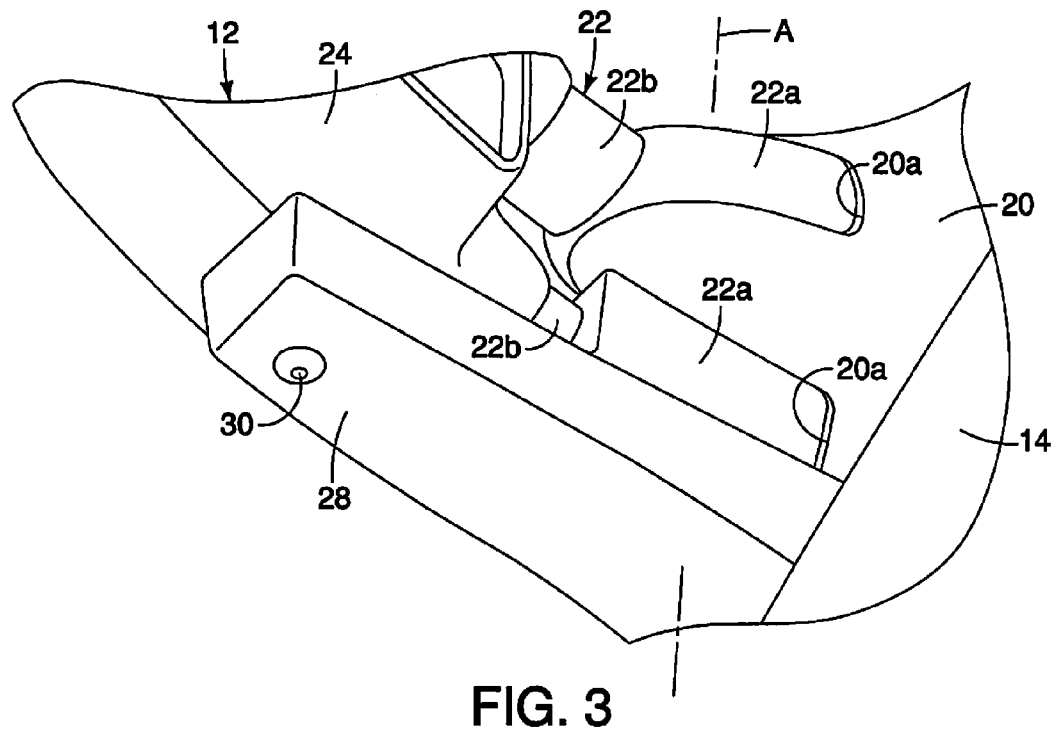
FIG. 3 is another perspective view of the mirror assembly depicted in FIG. 2, showing the camera housing unitarily formed with the base in a fixed position relative to the vehicle, with the mirror housing in the in-use orientation and the retracted position in accordance with the first embodiment.

As indicated in FIGS. 2-4, the vehicle attachment member 20 is provided with a pair of recesses 20a. As described below, the recesses 20a are formed in the vehicle attachment member 20 to support the telescoping portion 22.

The telescoping portion 22 includes base portions 22a and tubes 22b. The base portions 22a are installed within the recesses 20a of the vehicle attachment member 20. The base portions 22a can be rigidly fixed to and/or formed with the vehicle attachment member 20, or alternatively can be pivotally supported by a shaft (not shown) within the vehicle attachment member 20 where the shaft defines an axis A (FIGS. 3-6). Specifically, base portions 22a of the telescoping portion 22 can pivot about the axis A such that the mirror housing 24 is moved between an in-use orientation (FIGS. 1-4 and 6) and a folded position (FIG. 5). In the in-use orientation, the mirror housing 24 is positioned such that the vehicle operator (or passenger) can look at the adjustable mirror 26 and observe objects rearward of the mirror assembly 12. In the folded position (FIG. 5), the mirror housing 24 is pivoted about the axis A such that the adjustable mirror 26 faces and is adjacent to the side door 14 of the vehicle 10. As indicated in the drawings, the pivot axis A is approximately vertically oriented with the attachment member 20 attached to the vehicle door 14. Since the folded position is a conventional feature, further description is omitted for the sake of brevity.

The tubes 22b of the telescoping portion 22 are configured provide the mirror housing 24 with extending and retracting movement with respect to the base portions 22a and the vehicle attachment member 20. The tubes 22b of the telescoping portion 22 extend parallel to one another from the base portions 22a. Further, the tubes 22b of the telescoping portion 22 are slidably installed within apertures of the base portions 22a in order to provide the mirror housing 24 with telescoping movement. Alternatively, the tubes of the telescoping portion 22 can include inner and outer tube sections that provide the telescoping movement of the mirror housing 24 with respect to the vehicle attachment member 20.

In FIGS. 2-4, the mirror housing 24 is shown in a retracted position being a first distance away from the vehicle attachment member 20. In FIG. 6, the mirror housing 24 is shown in an extended position with the mirror housing 24 being a second distance away from the vehicle attachment member 20, the second distance being greater or longer than the first distance. It should be understood from the drawings and the description herein that the mirror housing 24 is depicted in the in-use orientation in FIGS. 1-4 and 6. The in-use orientation includes all telescoping positions of the mirror housing 24, where the mirror housing 24 can be telescoped outward to any position between the retracted position shown in FIG. 4 and the extended position depicted in FIG. 6.

The tubes 22b of the telescoping portion 22 are hollow such that mirror control cables C can extend from the mirror housing 24, through one of the tubes 22b and further through the vehicle attachment member 20, to the interior of the side door 14 such that a controller (not shown) and the control panel (not shown) provided within the vehicle 10 can control telescoping positioning of the mirror housing 24 and/or control the positional adjustments of the adjustable mirror 26 in a conventional manner.

A telescoping mechanism (not shown) of the telescoping portion 22 can include hydraulic or pneumatic mechanisms, step motor mechanisms, rack and pinion type mechanisms, belt driven mechanisms, etc., that are operated via operator commands inputted via the control panel (not shown) and carried out by the controller (not shown) in a conventional manner.

Examples of telescoping mechanisms in mirror assemblies are described in, for example, U.S. Pat. No. 4,583,155 to Hart, U.S. Pat. No. 7,540,619 to Henion, U.S. Pat. No. 7,287,867 to Wellington et al., and U.S. Pat. No. 7,270,430 to Olijnyk et al. U.S. Pat. No. 4,583,155, U.S. Pat. No. 7,540,619, U.S. Pat. No. 7,287,867, and U.S. Pat. No. 7,270,430 are all incorporated herein by reference in their entirety. Since such telescoping mechanisms are conventional, further description is omitted for the sake of brevity.

In the embodiment depicted in FIGS. 1-6 of the mirror assembly 12, the camera housing 28 is integrally and rigidly formed with the vehicle attachment member 20. In other words, the camera housing 28 can be integrally constructed with the vehicle attachment member 20 as a monolithic rigid structure. Consequently, the camera housing 28 is separated from the telescoping portion 22 and the mirror housing 24. Specifically, the telescoping portion 22 and the mirror housing 24 are able to pivot about the axis A between the folded position (FIG. 5) and the in-use orientations (FIGS. 1-4 And 6), while and the camera housing 28 is fixed in position relative to the vehicle attachment member 20 and the vehicle 10. As shown in FIG. 4, the camera housing 28 includes a first 28a, a mid-section 28b and a distal end 28c, with the mid-section 28b extending from the first end 28a to the distal end 28c. The first end 28a is fixed to the vehicle attachment member 20. Thus, the camera 30 is non-extensibly fixed to the vehicle attachment member 20 (a base), in a fixed position relative to the vehicle 10. However, with the mirror housing 24 in the in-use orientation, the mid-section 24a of the camera housing 28 extends parallel and adjacent to the mirror housing 24, as shown in FIGS. 2-4 and 6. Further, as shown in the drawings, the camera housing 28 extends beneath the mirror housing 24 with the mirror housing 24 in the in-use orientation.

Consequently, in the first embodiment, the mirror housing is coupled to the attachment member 20 (the base) for movement between the in-use orientation and a folded position about the pivot axis A that extends through the attachment member 20 (the base). Meanwhile, in the first embodiment, the camera housing 28 is non-movably fixed to the attachment member 20 (the base).

The camera housing 28 defines an aperture on a bottom surface thereof that faces away from the mirror housing 28 with a lens of the camera 30 being aligned with and being exposed through the aperture in the camera housing 28. The camera 30 is supported within the camera housing 28. As indicated in FIGS. 2 and 3, the camera 30 is positioned to capture images of an area at one side of the vehicle 10 with the mirror assembly 12 attached to the vehicle door 14. Hence, the camera 30 is positioned to capture images of an area beneath the mirror housing 24 and the camera housing 28.

Second Embodiment

Referring now to FIGS. 7-10, a mirror assembly 112 in accordance with a second embodiment will now be explained. In view of the similarity between the first and second embodiments, the parts of the second embodiment that are identical to the parts of the first embodiment will be given the same reference numerals as the parts of the first embodiment. Moreover, the descriptions of the parts of the second embodiment that are identical to the parts of the first embodiment may be omitted for the sake of brevity.

The mirror assembly 112 in accordance with the second embodiment includes a vehicle attachment member 120 (or mirror base), telescoping portions 122a and 122b, a mirror housing 124, an adjustable mirror 126 (FIGS. 9 and 10), a camera housing 128 and a camera 30.

As indicated in FIGS. 7-10, the vehicle attachment member 120 includes the mounting section M that is configured for attachment to the side door 14 of the vehicle 10. The vehicle attachment member 120 is also provided with a pair of slots 120a, whose purpose is described further below.

The telescoping portion 122a includes a base portion 122c. The telescoping portion 122a is slidably installed into an aperture of the base portion 122c. The base portion 122c is supported by the vehicle attachment member 120 within the uppermost one of the slots 120a of the vehicle attachment member 120. Further, the base portion 122c is pivotally supported on a shaft (not shown) that defines the axis A (FIGS. 7 and 8).

The telescoping portion 122b is slidably installed into an aperture of a base portion 128a (a first end) of the camera housing 128. The camera housing 128 further includes a mid-section 128b and a distal end 128c, with the mid-section 128b extending from the base portion 128a to the distal end 128c. The base portion 128a of the camera housing 128 is supported by the vehicle attachment member 120 within the lowermost one of the slots 120a of the vehicle attachment member 120. Further, the base portion 128a is pivotally supported on the shaft (not shown) that defines the axis A (FIGS. 7 and 8).

Figure 7:
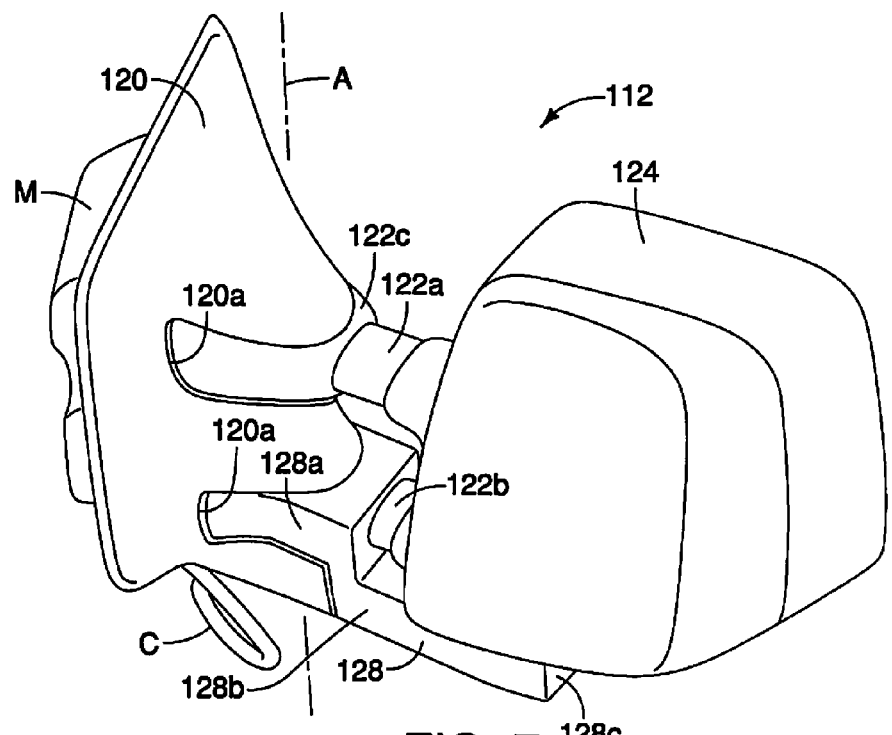
FIG. 7 is a perspective view of a mirror assembly showing a mirror housing in an in-use orientation and in a retracted position and a camera housing in an in-use orientation in accordance with a second embodiment.
Figure 8:
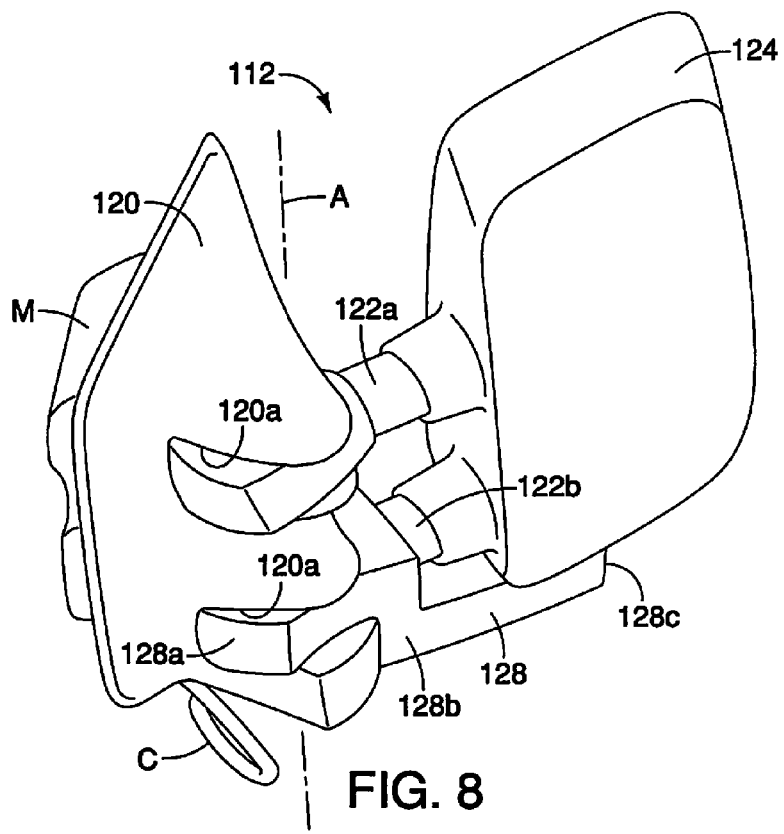
FIG. 8 is another perspective view of a mirror assembly similar to FIG. 7, showing the mirror housing and the camera housing in a folded position in accordance with the second embodiment.

As indicated in FIGS. 7 and 8, the mirror housing 124, the telescoping portion 122a and the camera housing 128 can pivot about the axis A such that the mirror housing 124 is moved between an in-use orientation (FIG. 7) and a folded position (FIG. 8). In the in-use orientation, the mirror housing 124 is positioned such that the vehicle operator (or passenger) can look at the adjustable mirror 126 and observe objects rearward of the mirror assembly 112. In the folded position (FIG. 8), the mirror housing 124 is pivoted about the axis A such that the adjustable mirror 126 faces and is adjacent to the side door 14 of the vehicle 10.

Figure 9:
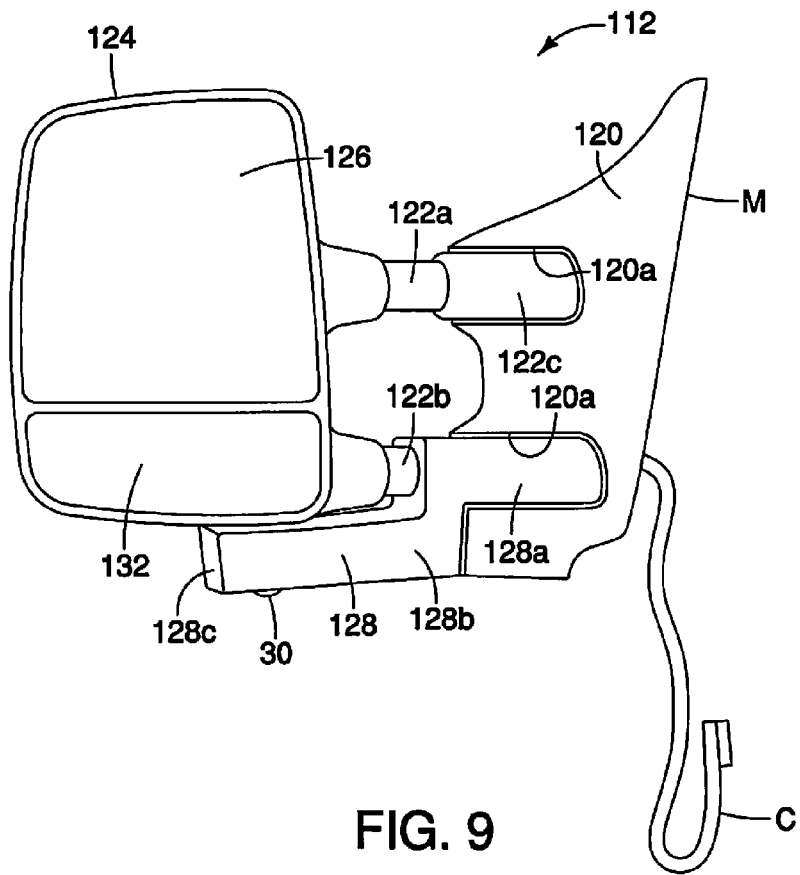
FIG. 9 is a rear view of the mirror assembly depicted in FIGS. 7 and 8, showing the mirror housing and the camera housing in the in-use orientation in accordance with the second embodiment.
Figure 10:
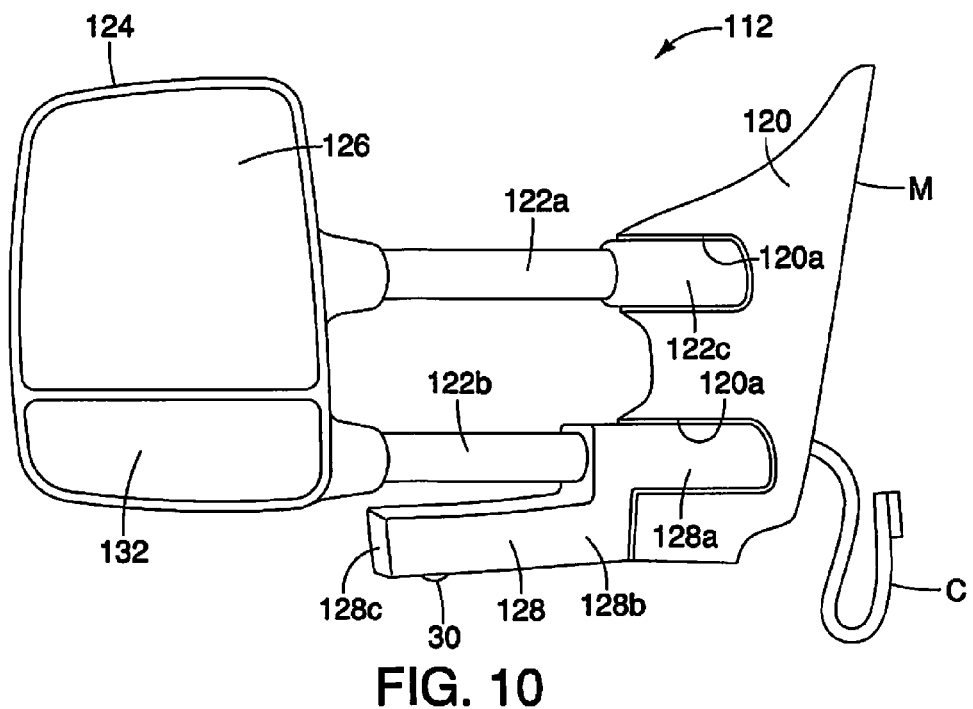
FIG. 10 is another rear view of the mirror assembly similar to FIG. 9, showing the mirror housing in the extended position and in the in-use orientation, and with the camera housing in the in-use orientation in accordance with the second embodiment.

In the second embodiment, the telescoping portions 122a and 122b are tubes that are configured to enable extending and retracting movement of the mirror housing 124 with respect to the vehicle attachment member 120. The telescoping portions 122a and 122b extend parallel to one another. In FIGS. 7 and 9 the mirror housing 124 is shown in a retracted position being a first distance away from the vehicle attachment member 120. In FIG. 10 the mirror housing 124 is shown in an extended position with the mirror housing 124 being positioned a second distance away from the vehicle attachment member 120, the second distance being greater or longer than the first distance. The mirror housing 124 is depicted in the in-use orientation in FIGS. 7, 9 and 10. The in-use orientation includes all telescoping positions of the mirror housing 124, where the mirror housing 124 can be telescoped outward to any position between the retracted position shown in FIG. 9 and the extended position depicted in FIG. 10.

The telescoping portions 122a and 122b (tubes) are hollow such that mirror control cables C can extend from the mirror housing 124, through one of the telescoping portions 122a and 122b, and further through the vehicle attachment member 120, to the interior of the side door 14 such that the controller (not shown) and the control panel (not shown) provided within the vehicle 10 can control telescoping positioning of the mirror housing 124 and/or control the positional adjustments of the adjustable mirror 126 in a conventional manner.

The base portion 122c of the telescoping portion 122a and the base portion 128a of the camera housing 128 are pivotally supported to the vehicle attachment member 120. Consequently, the mirror housing 124 and the camera housing 128 are coupled to one another with respect to the vehicle attachment member 120 and movement between the in-use orientation and the folded position about the pivot axis A.

As shown in FIGS. 9 and 10, the mirror housing 124 supports the adjustable mirror 126. The mirror housing 124 also includes a secondary mirror 132 (or spotter glass) that can be, for example, a fixed or adjustable convex mirror that provides a slightly enhanced view of objects reflected thereby.

The telescoping portions 22 and 122a of the two embodiments described above can be manually operated to position and/or fold the respective mirror housings 24 and 124 or can be electronically controlled by the above referenced telescoping mechanisms. The electronically controlled mechanisms can include a controller (not shown) which preferably includes a microcomputer with a mirror positioning control program that controls the position of the mirror housings 24 or 124, as discussed below. The controller can also include other conventional components such as an input interface circuit, an output interface circuit, and storage devices such as a ROM (Read Only Memory) device and a RAM (Random Access Memory) device. The memory circuit stores processing results and control programs such as ones for mirror positioning operation that are run by the processor circuit. The controller is operatively coupled to the mirror assemblies 12 and 112 in a conventional manner. The internal RAM of the controller stores statuses of operational flags and various control data. The internal ROM of the controller stores the control commands and control programming for various operations. The controller is capable of selectively controlling any of the components of the mirror assemblies 12 and 112 in accordance with stored control program. It will be apparent to those skilled in the art from this disclosure that the precise structure and algorithms for the controller can be any combination of hardware and software that will carry out the functions of the present invention.

The various vehicle components, such as the vehicle body, doors, etc, are conventional components that are well known in the art. Since these vehicle components are well known in the art, these structures will not be discussed or illustrated in detail herein. Rather, it will be apparent to those skilled in the art from this disclosure that the components can be any type of structure and/or programming that can be used to carry out the present invention.

GENERAL INTERPRETATION OF TERMS

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. Also as used herein to describe the above embodiments, the following directional terms "forward", "rearward", "above", "downward", "vertical", "horizontal", "below" and "transverse" as well as any other similar directional terms refer to those directions of a vehicle equipped with the mirror assembly. Accordingly, these terms, as utilized to describe the present invention should be interpreted relative to a vehicle equipped with the mirror assembly.

The term "configured" as used herein describes a component, section or part of a device that is constructed to carry out the desired function.

The terms of degree such as "substantially", "about" and "approximately" as used herein mean a reasonable amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. For example, the size, shape, location or orientation of the various components can be changed as needed and/or desired. Components that are shown directly connected or contacting each other can have intermediate structures disposed between them. The functions of one element can be performed by two, and vice versa. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such features. Thus, the foregoing descriptions of the embodiments according to the present invention are provided for illustration only, and not for the purpose of limiting the invention as defined by the appended claims and their equivalents.

What is claimed is:

1. An exterior vehicle mirror assembly comprising:
    a base having a mounting portion configured to attach to an exterior vehicle panel;
    a mirror housing attached to the base and extending from the base; and
    a camera housing having a first end, a mid-section and a distal end, the mid-section extending from the first end to the distal end, the first end being attached to the base, the mid-section of the camera housing extending from the first end such that the mirror housing and the camera housing extend away from the base in respective directions that are substantially parallel to one another with the mirror housing in an in-use orientation, the mid-section and the distal end of the camera housing being spaced apart from the mirror housing, and the camera housing being free from contact with the mirror housing.

2. The exterior vehicle mirror assembly according to claim 1, wherein
    the mirror housing is coupled to the base for movement between the in-use orientation and a folded position about a pivot axis that extends through the base, and
    the camera housing is non-movably fixed to the base.

3. The exterior vehicle mirror assembly according to claim 2, wherein
    the pivot axis is vertically oriented with the base attached to the exterior vehicle panel.

4. The exterior vehicle mirror assembly according to claim 1, wherein
    the mirror housing and the camera housing are coupled to the base for movement between the in-use orientation and a folded position about a pivot axis that extends through the base.

5. The exterior vehicle mirror assembly according to claim 4, wherein the pivot axis is vertically oriented with the base attached to the exterior vehicle panel.

6. The exterior vehicle mirror assembly according to claim 4, wherein
the mirror housing and the camera housing are coupled to one another proximate to the base for movement between the in-use orientation and the folded position.

7. The exterior vehicle mirror assembly according to claim 1, wherein
the mirror housing is coupled to the base for telescopic movement relative to the base between a retracted orientation and an extended orientation, and
the camera housing is non-extensibly coupled to the base.

8. The exterior vehicle mirror assembly according to claim 7, wherein
the mirror housing is coupled to the base for movement between the in-use orientation and a folded position about a pivot axis that extends through the base.

9. The exterior vehicle mirror assembly according to claim 7, wherein
the camera housing includes a first section and a second section that extend parallel to one another, the first section being vertically offset from the second section the second section and extending beneath a portion of the mirror housing with the base attached to the exterior vehicle panel and the mirror housing in the in-use orientation.

10. The exterior vehicle mirror assembly according to claim 9, wherein
the mirror housing includes a first telescoping structure and a second telescoping structure, the first telescoping structure being directly coupled to the base and the second telescoping structure being directly coupled to the first section of the camera housing.

11. The exterior vehicle mirror assembly according to claim 10, wherein
the first telescoping structure and the second telescoping structure are vertically aligned and spaced apart between a mirror supporting section of the mirror housing and the base.

12. The exterior vehicle mirror assembly according to claim 9, wherein
the first and second sections of the camera housing extend away from the base in a stepped configuration.

13. The exterior vehicle mirror assembly according to claim 1, wherein
the camera housing defines an aperture on a surface thereof that faces away from the mirror housing, the camera housing including a camera supported therein having a lens aligned with the aperture of the camera housing.

14. The exterior vehicle mirror assembly according to claim 13, wherein
the camera is positioned to capture images of an area at one side of a vehicle with the base attached to the exterior vehicle panel.

15. The exterior vehicle mirror assembly according to claim 13, wherein
the camera is positioned to capture images of an area beneath the mirror housing and the camera housing.

16. The exterior vehicle mirror assembly according to claim 13, wherein
an upper surface of the camera housing is spaced apart from the mirror housing at a location vertically aligned with the camera, and the upper surface of the camera housing is free from contact with the mirror housing between the location vertically aligned with the camera and the distal end of the camera housing.

17. The exterior vehicle mirror assembly according to claim 1, wherein
the mirror housing supports an adjustable mirror therein.

18. The exterior vehicle mirror assembly according to claim 1, wherein
the mirror housing includes a first mirror supporting section and a second mirror supporting section, with the first mirror supporting section housing an adjustable mirror and the second mirror supporting section housing a secondary mirror.

19. An exterior vehicle mirror assembly comprising
a base having a mounting portion configured to attach to an exterior vehicle panel;
a mirror housing attached to the base and extending from the base, the mirror housing being attached to the base for telescopic movement relative to the base between a retracted orientation and an extended orientation; and
a camera housing attached to the base adjacent to the mirror housing and extending from the base such that the mirror housing and the camera housing extend away from the base in respective directions that are substantially parallel to one another with the mirror housing in an in-use orientation, the camera housing being spaced apart from the mirror housing, the camera housing being non-extensibly coupled to the base, and the camera housing extending beneath the mirror housing with the mirror housing in the retracted orientation and the base attached to the exterior vehicle panel.

20. An exterior vehicle mirror assembly comprising:
a base having a mounting portion configured to attach to an exterior vehicle panel;
a mirror housing attached to the base and extending from the base for telescopic movement relative to the base between a retracted orientation and an extended orientation, the mirror housing further being attached to the base for movement between an in-use orientation and a folded position about a pivot axis that extends through the base; and
a camera housing having a first end, a distal end and a mid-section that extends from the first end to the distal end, the first end of the camera housing being attached to the base for pivotal movement between an in-use orientation and a folded position about the pivot axis, the mid-section of the camera housing extending from the base such that the mid-section of the mirror housing and the camera housing extend away from the base in respective directions that are substantially parallel to one another with the mirror housing in its in-use orientation and the camera housing in its in-use orientation, the mid-section and the distal end of the camera housing being spaced apart from the mirror housing, and the camera housing being non-extensibly coupled to the base.

* * * * *